US012595143B2

(12) United States Patent
Kakuta et al.

(10) Patent No.: US 12,595,143 B2
(45) Date of Patent: Apr. 7, 2026

(54) SHEET FEEDING DEVICE AND IMAGE FORMING APPARATUS

(71) Applicant: KYOCERA Document Solutions Inc., Osaka (JP)

(72) Inventors: Masayuki Kakuta, Osaka (JP); Sachio Izumichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/059,664

(22) Filed: Feb. 21, 2025

(65) Prior Publication Data

US 2025/0271807 A1 Aug. 28, 2025

(30) Foreign Application Priority Data

Feb. 26, 2024 (JP) ................................ 2024-026523

(51) Int. Cl.
*B65H 1/14* (2006.01)
*B65H 7/04* (2006.01)
*B65H 7/14* (2006.01)

(52) U.S. Cl.
CPC ................. *B65H 1/14* (2013.01); *B65H 7/04* (2013.01); *B65H 7/14* (2013.01); *B65H 2407/21* (2013.01); *B65H 2511/515* (2013.01); *B65H 2511/52* (2013.01); *B65H 2553/414* (2013.01); *B65H 2601/273* (2013.01); *B65H 2801/06* (2013.01); *G03G 2215/00616* (2013.01); *G03G 2215/00725* (2013.01)

(58) Field of Classification Search
CPC .................. B65H 1/14; B65H 2407/21; B65H 2511/515; B65H 2601/273; B65H 7/04; B65H 7/14; B65H 2511/51; G03G 2215/00725; G03G 15/6514
See application file for complete search history.

(56) References Cited

U.S. PATENT DOCUMENTS 11,459,197 B2 * 10/2022 Fujii ........................ B65H 1/14
2017/0283200 A1 * 10/2017 Nakagawa ............... B65H 3/66

FOREIGN PATENT DOCUMENTS

JP 2023-028807 A 3/2023

OTHER PUBLICATIONS

Extended European Search Report dated Jul. 15, 2025, issued by the European Patent Office in corresponding application EP 25159560.9.

* cited by examiner

*Primary Examiner* — Jeremy R Severson
(74) *Attorney, Agent, or Firm* — Stein IP, LLC

(57) ABSTRACT

A sheet feeding device includes a sheet storage portion, a lifting plate, a swing driving portion, a feeding portion, a sheet detection portion, and a control portion. The control portion arranges the lifting plate in a feeding position when a feeding job for the sheet starts, and arranges the lifting plate in a retracted position when the feeding job ends. At the end of the feeding job, while the lifting plate is moving from the feeding position to the retracted position, if the detection state of the sheet detection portion changes from a sheet-present state to a no-sheet state, the control portion rearranges the lifting plate in the feeding position.

5 Claims, 5 Drawing Sheets

SHEET FEEDING DEVICE AND IMAGE FORMING APPARATUS

INCORPORATION BY REFERENCE

This application is based on and claims the benefit of priority from Japanese Patent Application No. 2024-026523 filed on Feb. 26, 2024, the contents of which are hereby incorporated by reference.

BACKGROUND

The present disclosure relates to a sheet feeding device and an image forming apparatus.

Image forming apparatuses such as copiers and printers include a sheet feeding device. The sheet feeding device separates and conveys sheets one by one to an image forming portion from a sheet storage portion that stores, in a stacked state, the sheets as a recording medium on which to print (record) images.

SUMMARY

According to one aspect of the present disclosure, a sheet feeding device includes a sheet storage portion, a lifting plate, a swing driving portion, a feeding portion, a sheet detection portion, and a control portion. In the sheet storage portion, sheets are stacked. The lifting plate is arranged in the sheet storage portion and its downstream part with respect to the sheet conveyance direction swings in the up-down direction about its upstream part with respect to the sheet conveyance direction to move the sheets stacked on its top face between a feeding position and a retracted position lower than the feeding position. The swing driving portion swings, in the up-down direction, the downstream part of the lifting plate with respect to the sheet conveyance direction. The feeding portion separates and conveys the sheets arranged in the feeding position one by one downstream of the sheet storage portion in the sheet conveyance direction. The sheet detection portion is provided on the lifting plate and detects whether a sheet is present on the lifting plate. The control portion controls the operation of the swing driving portion and the feeding portion. The control portion arranges the lifting plate in the feeding position when a feeding job for the sheet starts, and arranges the lifting plate in the retracted position when the feeding job ends. At the end of the feeding job, while the lifting plate is moving from the feeding position to the retracted position, if the detection state of the sheet detection portion changes from a sheet-present state to a no-sheet state, the control portion rearranges the lifting plate in the feeding position.

DETAILED DESCRIPTION

An embodiment of the present disclosure will be described below with reference to the accompanying drawings. The present disclosure is not limited to what is specifically described below.

Figure 1:
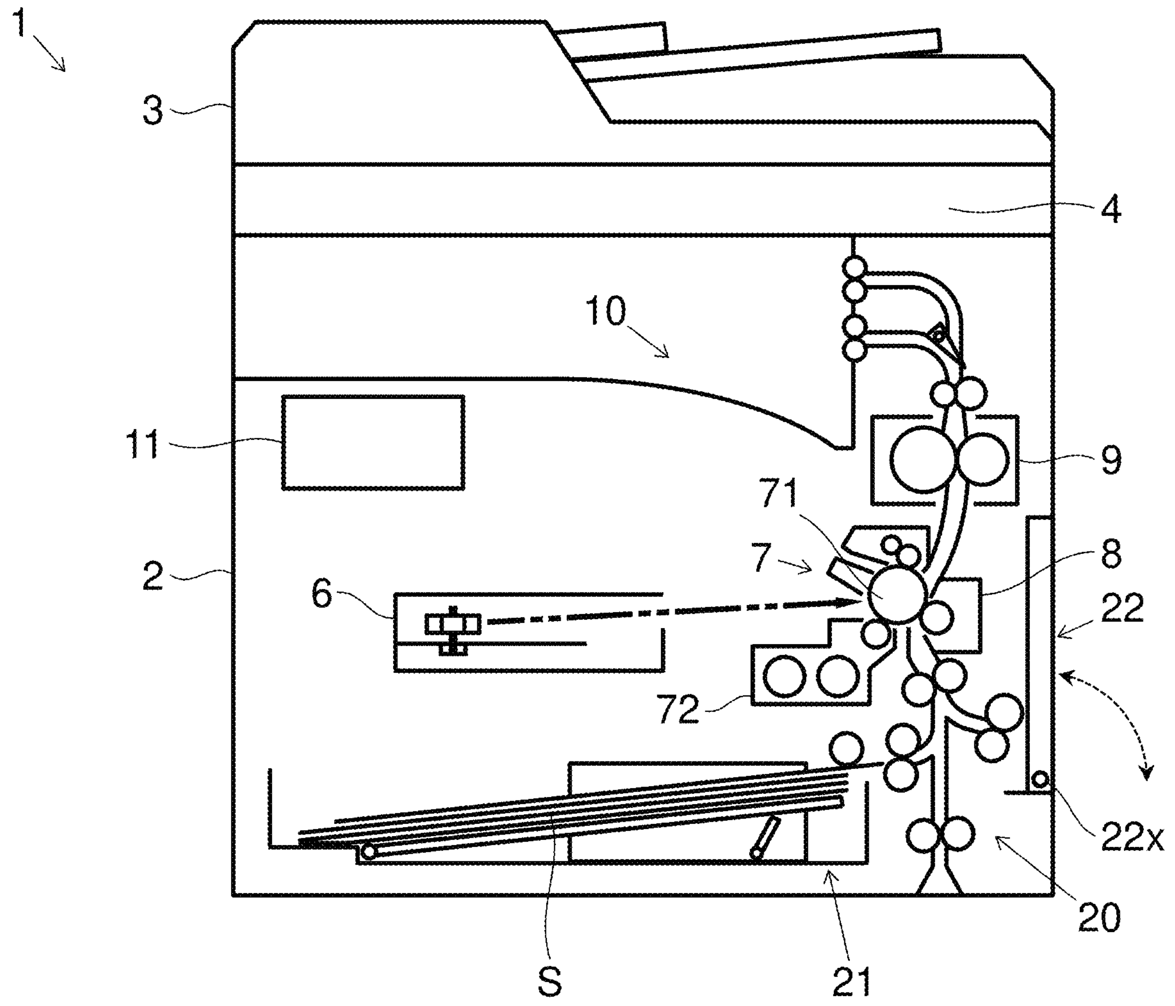
FIG. 1 is a schematic sectional front view of an image forming apparatus according to one embodiment of the present disclosure.
Figure 2:
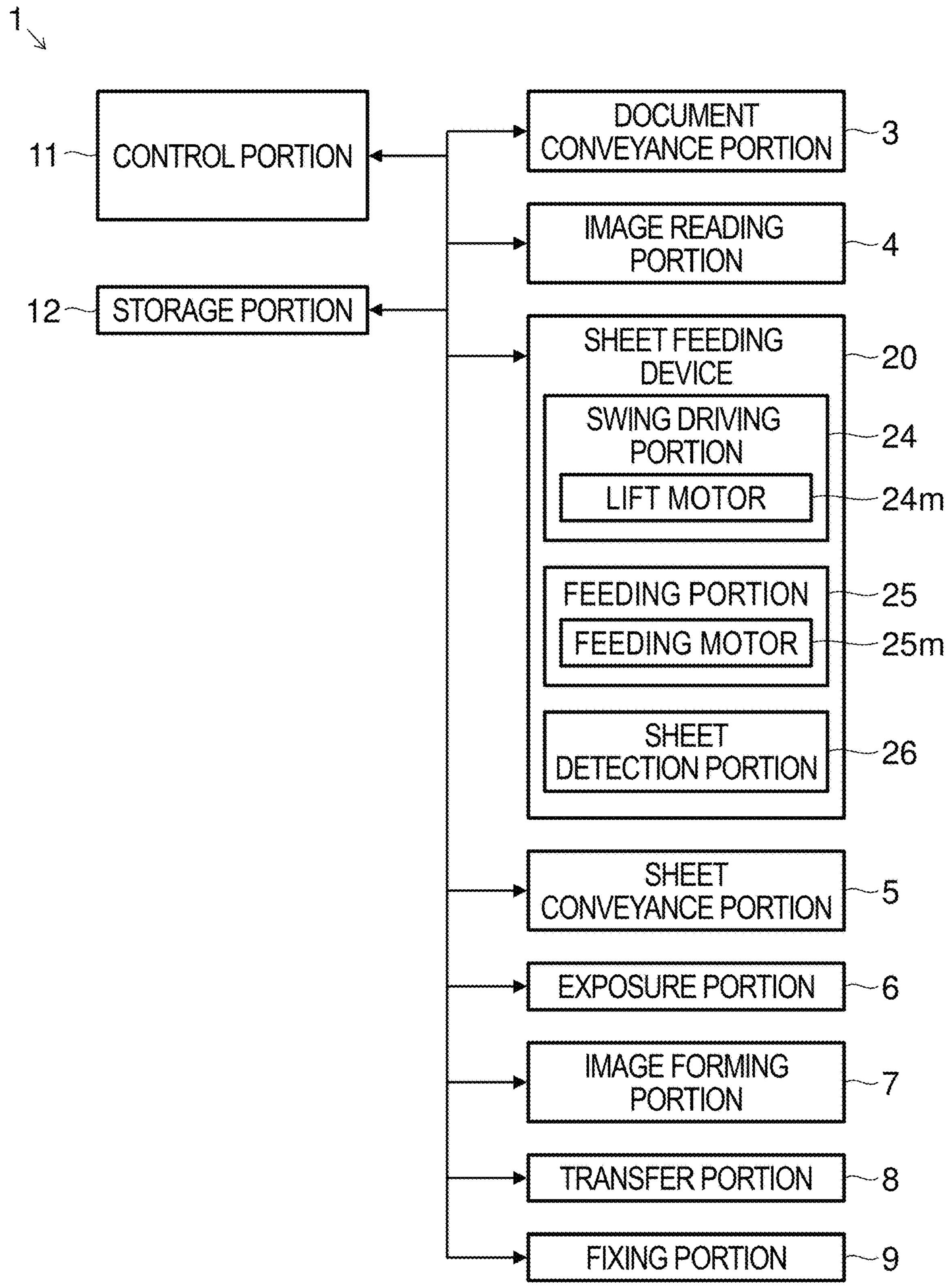
FIG. 2 is a block diagram showing the configuration of the image forming apparatus in FIG. 1.

FIG. 1 is a schematic sectional front view of an image forming apparatus 1 of the embodiment. FIG. 2 is a block diagram showing the configuration of the image forming apparatus 1 in FIG. 1. One example of the image forming apparatus 1 of the embodiment can be what is called a multifunction peripheral for monochrome printing that has functions such as printing, scanning (image reading), and facsimile transmission. The image forming apparatus 1 may be, for example, a device such as a copier or a printer and may be for color printing.

As shown in FIGS. 1 and 2, the image forming apparatus 1 includes a document conveyance portion 3 and an image reading portion 4. The document conveyance portion 3 is placed on the top face of an apparatus main body 2 of the image forming apparatus 1. The image reading portion 4 is arranged below the document conveyance portion 3, inside the apparatus main body 2. An image on a document placed on the document conveyance portion 3 or an image on a document placed on a contact glass (not illustrated) on the top face of the image reading portion 4 is read by the image reading portion 4.

The image forming apparatus 1 further includes, in the apparatus main body 2, a sheet feeding device 20, a sheet conveyance portion 5, an exposure portion 6, an image forming portion 7, a transfer portion 8, a fixing portion 9, a sheet discharging portion 10, a control portion 11, and a storage portion 12.

The sheet feeding device 20 is arranged in a bottom part of the apparatus main body 2. The sheet feeding device 20 includes a sheet feeding cassette 21 and a sheet feeding tray 22. The sheet feeding cassette 21 and the sheet feeding tray 22 are sheet storage portions where a plurality of unprinted sheets (recording medium) S are stacked on. The sheet feeding device 20 separates and feeds out the sheets S one by one from the sheet feeding cassette 21 and the sheet feeding tray 22 during printing. The configuration around the sheet feeding tray 22 in the sheet feeding device 20 will be described in detail later.

The sheet conveyance portion 5 extends along a side wall of the apparatus main body 2 in the up-down direction. The sheet conveyance portion 5 conveys the sheets S fed out from the sheet feeding device 20 to the transfer portion 8 and the fixing portion 9 and then discharges the sheets S after fixing to the sheet discharging portion 10. The exposure portion 6 irradiates the image forming portion 7 with laser light controlled based on image data.

The image forming portion 7 is arranged above the sheet feeding device 20. The image forming portion 7 includes a photosensitive drum 71 and a development device 72. In the image forming portion 7, the outer circumferential surface of the photosensitive drum 71 is irradiated with the laser light from the exposure portion 6 to form an electrostatic latent image of a document image. The development device 72 feeds toner to the electrostatic latent image on the outer circumferential surface of the photosensitive drum 71 to develop it into a toner image.

The transfer portion 8 is arranged on a sheet conveyance path in the sheet conveyance portion 5 adjacent to the photosensitive drum 71. The transfer portion 8 transfers the toner image formed on the outer circumferential surface of the photosensitive drum 71 to the sheet S.

The fixing portion 9 is arranged above the transfer portion 8. The fixing portion 9 heats and presses the sheet S having the toner image transferred to it to fix the toner image to the sheet S.

The sheet discharging portion 10 is arranged below the image reading portion 4. The sheet S having the toner image fixed to it and having completed printing is conveyed to the sheet discharging portion 10. The sheet discharging portion 10 has an opening at the front and the printed sheet (printed matter) is taken out from the front.

The control portion 11 includes a CPU, an image processing portion, and other electronic circuits and electronic components (none is illustrated). The CPU controls the operation of different components in the image forming apparatus 1 and performs processing related to the functions of the image forming apparatus 1 based on control programs and data stored in the storage portion 12. The sheet feeding device 20, the sheet conveyance portion 5, the exposure portion 6, the image forming portion 7, the transfer portion 8, and the fixing portion 9 individually receive commands from the control portion 11 and cooperate to print on the sheet S.

For the control of the operation of the sheet feeding device 20, the sheet feeding device 20 may be given the above-mentioned functions of the control portion 11.

The storage portion 12 is, for example, configured as a combination of a non-volatile storage device (not illustrated) such as a program ROM (read-only memory) and a data ROM, and a volatile storage device (not illustrated) such as a RAM (random-access memory).

Figure 3:
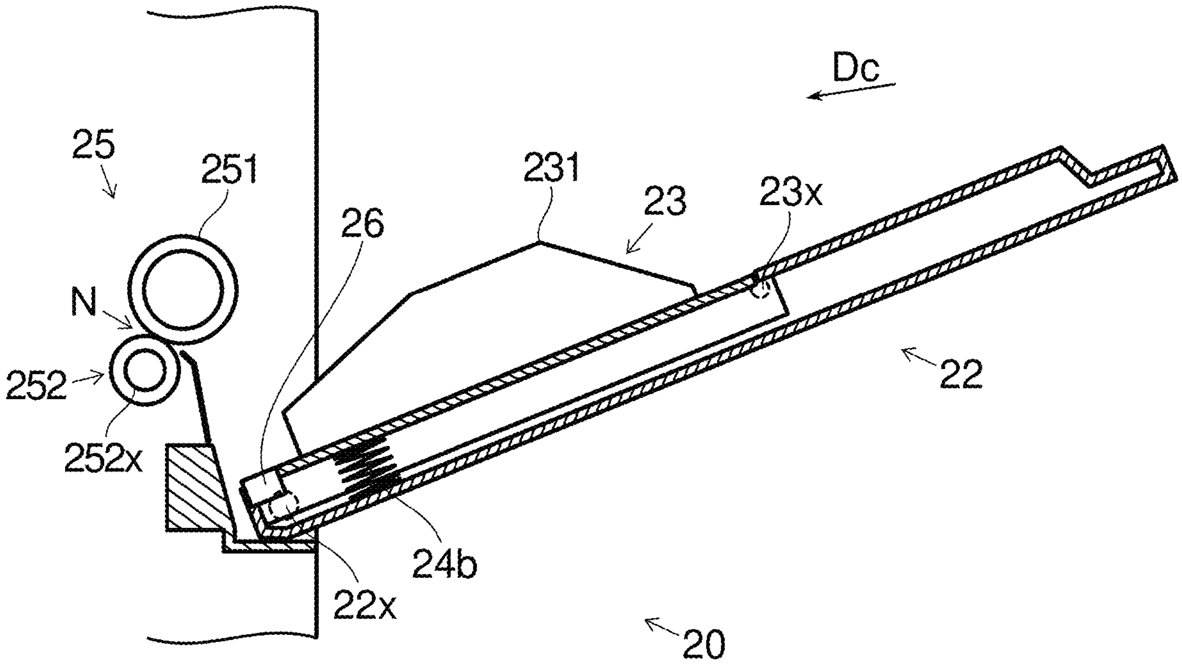
FIG. 3 is a sectional front view around a sheet feeding tray of a sheet feeding device in the image forming apparatus in FIG. 1.
Figure 4:
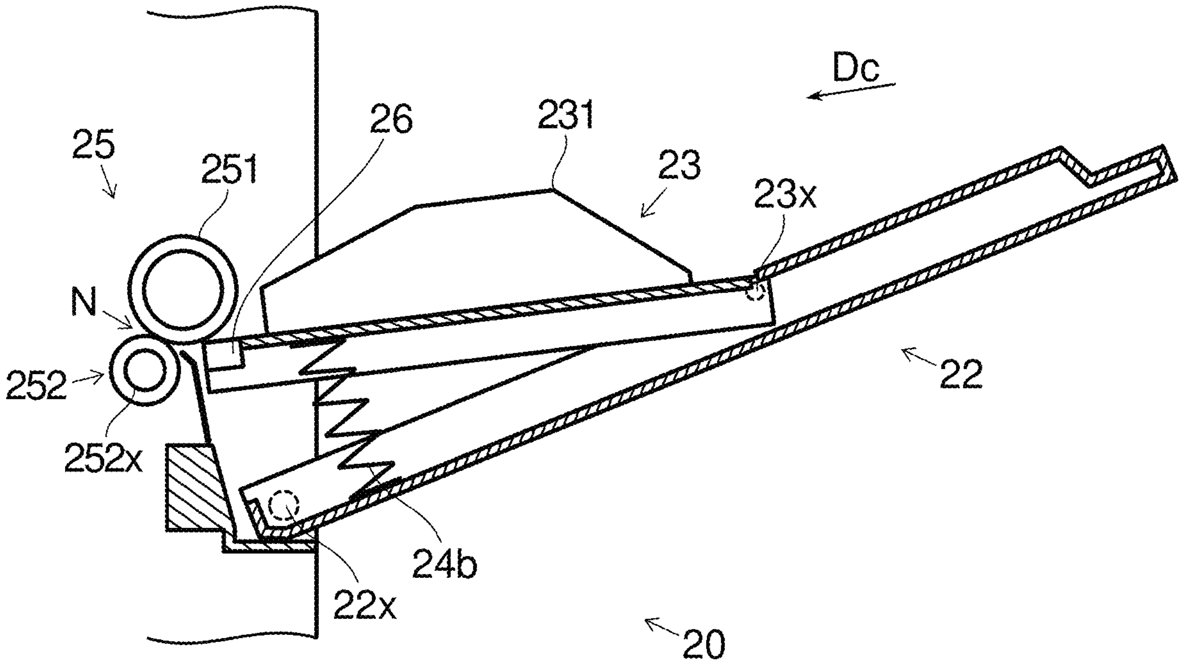
FIG. 4 is a sectional front view around the sheet feeding tray in FIG. 3, showing a lifting plate in a feeding position.

Next, the configuration around the sheet feeding tray 22 in the sheet feeding device 20 will be described with reference to FIGS. 1 and 2 and also to FIGS. 3 and 4. FIG. 3 is a sectional front view around the sheet feeding tray 22 in the sheet feeding device 20 in the image forming apparatus 1 in FIG. 1. FIG. 4 is a sectional front view around the sheet feeding tray 22 in FIG. 3, showing a lifting plate in a feeding position.

The sheet feeding device 20 includes the sheet feeding tray (sheet storage portion) 22, the lifting plate 23, a swing driving portion 24, a feeding portion 25, and a sheet detection portion 26.

The sheet feeding tray 22 is arranged on a side face of the apparatus main body 2, and is configured as a part of the exterior of the apparatus main body 2. The sheet feeding tray 22 has a shaft 22*x* arranged in a lower end part of it when it is closed with respect to the apparatus main body 2. The shaft 22*x* extends in the sheet width direction, which is orthogonal to the sheet conveyance direction Dc. The sheet feeding tray 22 is supported on the frame of the apparatus main body 2 via the shaft 22*x* so as to be rotatable about the axis of the shaft 22*x*. The sheet feeding tray 22 can be opened and closed with respect to the apparatus main body 2 as an upper end part of it is swung in a lateral direction about the shaft 22*x* in its lower end part.

A feeding port for the sheets S on the sheet feeding tray 22 into the apparatus main body 2 is opened when the sheet feeding tray 22 is opened, and is closed when the sheet feeding tray 22 is closed. That is, with the sheet feeding tray 22 open, the sheets S can be placed on the sheet feeding tray 22. FIGS. 3 and 4 show a state in which the sheet feeding tray 22 is open and the state in which the sheet feeding tray 22 is open will be described below.

The sheet feeding tray 22 is a sheet storage portion that can store a plurality of sheets S of a recording medium such as unprinted cut paper. The sheet feeding tray 22 is formed in the shape of a plate with a flat top face and the sheets S are placed on the top face from above. The sheet S in the sheet feeding tray 22 is fed out to the right (the sheet conveyance direction Dc) in FIGS. 3 and 4 by the operation of the feeding portion 25.

The lifting plate 23 is arranged in the sheet feeding tray 22. A downstream part of the sheet S in the sheet feeding tray 22 in the sheet conveyance direction Dc is placed on the lifting plate 23. The lifting plate 23 has, in an upstream end part of it in the sheet conveyance direction Dc, a shaft 23*x* extending in the sheet width direction. The lifting plate 23 is supported on the sheet feeding tray 22 via the shaft 23*x* so as to be rotatable about the shaft 23*x*.

The lifting plate 23 can swing with its downstream end in the sheet conveyance direction Dc as a swinging end about the shaft 23*x*. In other words, a downstream part of the lifting plate 23 swings in the up-down direction about the shaft 23*x* in an upstream part of it with respect to the sheet conveyance direction Dc. The lifting plate 23 changes its inclination angle with respect to the top face of the sheet feeding tray 22 according to the quantity of sheets S placed on it. The lifting plate 23 is driven by the swing driving portion 24 to move the sheets S placed on the top face between a feeding position and a retracted position lower than the feeding position.

On the lifting plate 23, a pair of width restriction cursors 231 are arranged. The pair of width restriction cursors 231 can move reciprocably along the sheet width direction and position the sheets S placed on the lifting plate 23 in the sheet width direction.

The swing driving portion 24 includes an urging member 24*b*, a positioning mechanism (not illustrated), and a lift motor 24*m*.

The urging member 24*b* is arranged downstream of the shaft 23*x* of the lifting plate 23 in the sheet conveyance direction Dc, between the sheet feeding tray 22 and the lifting plate 23. The upper end of the urging member 24*b* makes contact with the lifting plate 23 and the lower end of the urging member 24*b* makes contact with the sheet feeding tray 22. The urging member 24*b* is configured with, for example, a compression coil spring and urges the lifting plate 23 upward. That is, the urging member 24*b* urges the lifting plate 23 toward the feeding position of the sheets S.

The positioning mechanism is driven by the lift motor 24*m* and positions the lifting plate 23 urged upward by the urging member 24*b*. The configuration of the positioning mechanism is not particularly limited. The positioning mechanism can be configured, for example, to have a contact piece that makes contact with the lifting plate 23 and to move the contact piece reciprocably along the up-down direction with the lift motor 24*m* via a mechanism using a belt or a pulley or via a rack and pinion mechanism. For the setting of the position of the lifting plate 23, a sensor can be used to detect the position of the lifting plate 23 to stop the lifting plate 23, or the drive of the lift motor 24*m* can be so timed as to stop the lifting plate 23 at a predetermined position.

With the configuration described above, downstream parts of the swing driving portion 24 and the lifting plate 23 in the sheet conveyance direction Dc are swung in the up-down direction. Specifically, when a sheet S is fed from the sheet feeding tray 22, the swing driving portion 24 raises the lifting plate 23 to move it to the feeding position of the sheet S. When no sheet S is fed from the sheet feeding tray 22, the swing driving portion 24 lowers the lifting plate 23 to move it to the retracted position below the feeding position. The operation of the swing driving portion 24 is controlled by the control portion 11.

In a state where the lifting plate 23 is arranged in the feeding position of the sheet S, a feeding roller 251, which will be described later, stays in contact with the top layer of the sheets S placed on the lifting plate 23. In a state where the lifting plate 23 is arranged in the retracted position, the feeding roller 251 stays away from the sheets S placed on the lifting plate 23.

The feeding portion 25 is arranged above a downstream part of the sheet feeding tray 22 in the sheet conveyance direction Dc. The feeding portion 25 includes the feeding roller 251 and a separation roller (separation member) 252. The rotation axes of the feeding and separation rollers 251 and 252 extend along the front-rear direction (sheet width direction) in the sheet feeding tray 22. The feeding portion 25 separates and conveys the sheets S arranged in the feeding position one by one downstream of the sheet feeding tray 22 in the sheet conveyance direction Dc. In other words, the sheets S stored in the sheet feeding tray 22 are separated and conveyed one by one by the feeding portion 25 to the sheet conveyance portion 5, downstream in the sheet conveyance direction Dc.

The feeding roller 251 is arranged above the downstream end, in the sheet conveyance direction Dc, of the sheets S placed on the sheet feeding tray 22 and the lifting plate 23. The feeding roller 251 is arranged such that a lower part of its outer circumferential surface is located in the sheet conveyance path that extends from the sheet feeding tray 22 downstream in the sheet conveyance direction Dc. The feeding roller 251 is coupled with a feeding motor **25*m* provided in the apparatus main body 2 and rotates by receiving a motive power from the feeding motor 25*m*. The feeding roller 251 feeds out the sheets S on the lifting plate 23** downstream in the sheet conveyance direction Dc.

The separation roller 252 is arranged below the feeding roller 251 across the sheet conveyance path in the feeding portion 25. By the action of an urging member (not illustrated), the separation roller 252 presses and stays in contact with the feeding roller 251. The sheet S is inserted in a nip portion N formed between the separation and feeding rollers 251 and 252 in contact with each other. The separation roller 252 is not coupled to the motor and rotates by making contact with and following the rotation of the feeding roller 251.

The separation roller 252 is provided with, for example, a torque limiter (not illustrated) on its shaft **252*x*. If there is no sheet S in the nip portion N or if only one sheet S enters the nip portion N, a torque higher than or equal to the set torque of the torque limiter acts on the separation roller 252 and the separation roller 252 rotates in a direction feeding out the sheet S by following the feeding roller 251. In this way, the feeding portion 25 separates and conveys the sheets S on the lifting plate 23 one by one. The operation of the feeding motor 25*m* in the feeding portion 25 is controlled by the control portion 11**.

By contrast, if a plurality of sheets S overlapping with each other enter the nip portion N, the torque that acts on the separation roller 252 is lower than the set torque of the torque limiter and the separation roller 252 stops rotating. In this way, the sheets S underneath are not fed out and this prevents the problem of multiple feeding, that is, the feeding of sheets S overlapping with each other.

The sheet detection portion 26 is provided on the lifting plate 23. The sheet detection portion 26 is arranged at the downstream end of the lifting plate 23 in the sheet conveyance direction Dc, substantially in a middle part in the sheet width direction.

The sheet detection portion 26 includes a reflection type optical sensor having a light-emitting portion that includes a light-emitting element such as an LED (light-emitting diode) and a light-receiving portion that includes a light-receiving element such as a photodiode. The light-emitting portion irradiates the sheet S on the lifting plate 23 with detecting light at a predetermined angle. The light-receiving portion receives the detecting light (reflected light) emitted from the light-emitting portion toward the sheet S and reflected by the sheet S.

If a sheet S is on the lifting plate 23, the detecting light emitted from the light-emitting portion is reflected by the sheet S and much of it enters the light-receiving portion. Thus, the detection value (voltage value) is high due to the sheet S being on the lifting plate 23. By contrast, if no sheet S is on the lifting plate 23, the detecting light emitted from the light-emitting portion is not reflected by the sheet S and no light enters the light-receiving portion. Thus, the detection value (voltage value) is low due to no sheet S being on the lifting plate 23.

In this way, the sheet detection portion 26 detects whether a sheet S is present on the lifting plate 23. With this configuration, the reflection type optical sensor appropriately detects whether a sheet S is present on the lifting plate 23. Then, an output signal (detection signal) from sheet detection portion 26 is fed to the control portion 11.

The method for detecting whether a sheet S is present on the lifting plate 23 is not limited to one using a reflection type optical sensor. For example, it is possible to use a method of detecting, with a sensor, the movement of an actuator that retractably pops up from the top face of the lifting plate 23 toward the sheet S and that is rotatable about an axis extending in the sheet width direction.

With respect to the sheet feeding tray 22, the control portion 11 arranges the lifting plate 23 in the feeding position of the sheet S when a feeding job for the sheet S is started. The control portion 11 controls the operation of the swing driving portion 24 and the feeding portion 25 according to the command for the feeding job and conveys the sheet S from the sheet feeding tray 22 into the apparatus main body 2. The control portion 11 arranges the lifting plate 23 in the retracted position when the feeding job for the sheet S ends.

At the end of the feeding job for the sheet S, while the lifting plate 23 is moving from the feeding position to the retracted position, if the detection state of the sheet detection portion 26 changes from a sheet-present state to a no-sheet state, the control portion 11 rearranges the lifting plate 23 in the feeding position.

With the configuration described above, also if the sheet S is stuck and left in the nip portion N of the feeding roller 251 and no sheet is on the lifting plate 23, it is judged that the sheet S remains in the sheet feeding tray 22. That is, it is possible to appropriately detect whether a sheet S is present on the sheet feeding tray 22. This helps prevent erroneous detection according to whether a sheet S is present on the sheet feeding tray 22.

When the lifting plate 23 is rearranged in the feeding position at the end of the feeding job for the sheet S, if the detection state of the sheet detection portion 26 is the no-sheet state, the lifting plate 23 is arranged in the retracted position. For example, after the lifting plate 23 is rearranged in the feeding position and all the sheets S on the sheet feeding tray 22 are taken away by the user, the control portion 11 arranges the lifting plate 23 in the retracted position.

With the configuration described above, if the lifting plate 23 is rearranged in the feeding position and there is no sheet on the lifting plate 23, the lifting plate 23 is immediately and automatically arranged in the retracted position in preparation for the user to supply the sheet S to the sheet feeding tray 22. This allows smooth sheet feeding using the sheet feeding tray 22.

Figure 5:
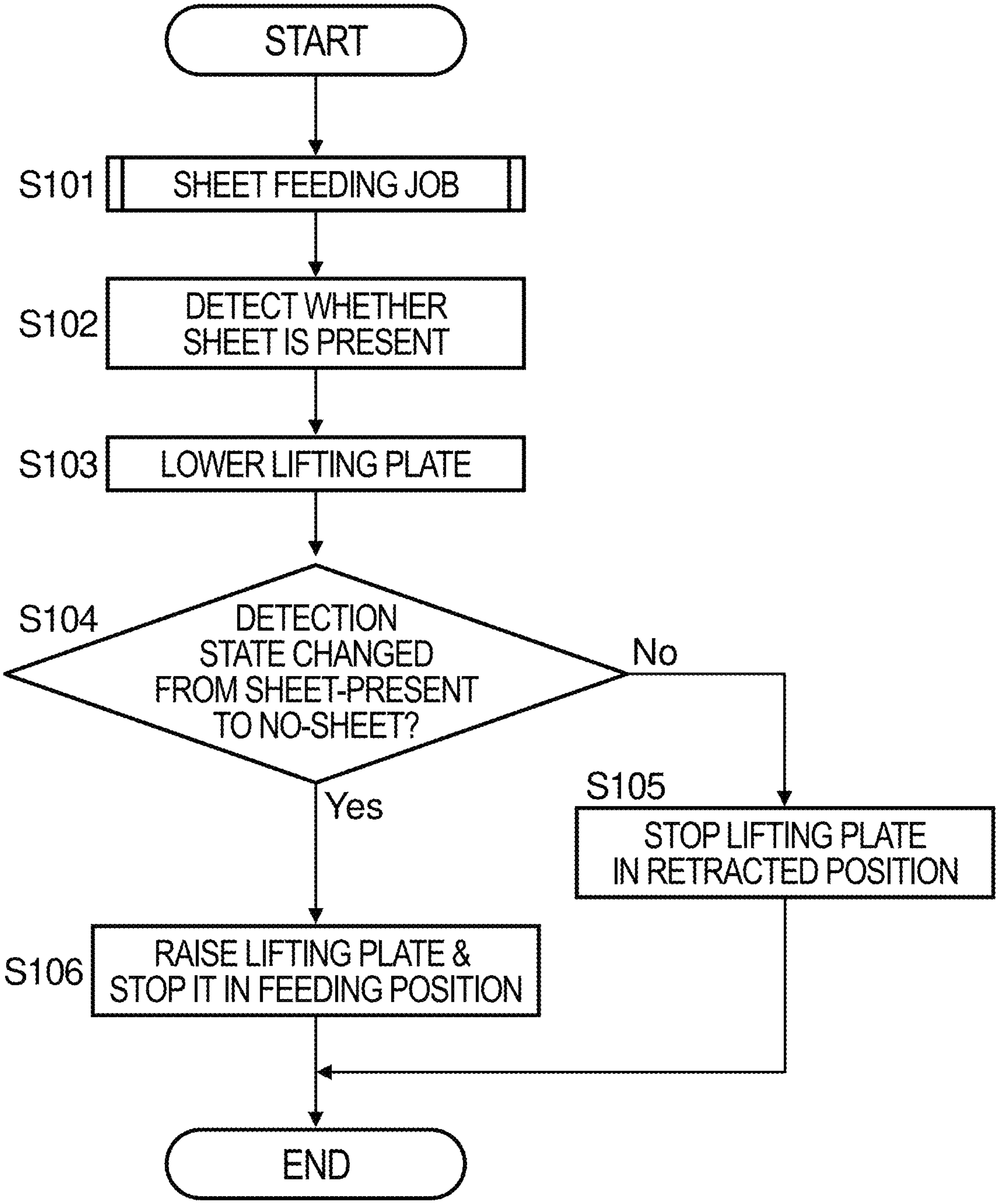
FIG. 5 is a flow chart showing an example of the procedure of sheet feeding operation using the sheet feeding tray in FIG. 3.

Next, an example of a procedure of sheet feeding operation using the sheet feeding tray 22 will be described with reference to FIG. 5. FIG. 5 is a flow chart showing an example of the procedure of sheet feeding operation using the sheet feeding tray 22 in FIG. 3. The following description deals with a print job that involves sheet feeding using the sheet feeding tray 22 as a command.

When a print job is received in the image forming apparatus 1 ("START" in FIG. 5), the control portion 11 performs a feeding job for the sheet S using the sheet feeding tray 22 (Step S101).

When the feeding job for the sheet S ends, the control portion 11 detects whether the sheet S is present on the lifting plate 23 (Step S102). When the feeding job for the sheet S ends, the lifting plate 23 is arranged in the feeding position of the sheet S. The control portion 11 detects whether the sheet S is present on the lifting plate 23 based on a detection signal fed from the sheet detection portion 26.

Then the control portion 11 makes the swing driving portion 24 lower the lifting plate 23 to move it to the retracted position (Step S103).

Next, while the lifting plate 23 is moving from the feeding position to the retracted position, the control portion 11 checks whether the detection state of the sheet detection portion 26 changes from the sheet-present state to the no-sheet state (Step S104).

If the detection state of the sheet detection portion 26 remains unchanged from the sheet-present state or it is the no-sheet state (No in Step S104), the control portion 11 stops the lifting plate 23 as it is in the retracted position (Step S105) and ends the procedure of FIG. 5.

By contrast, if the detection state of the sheet detection portion 26 changes from the sheet-present state to the no-sheet state (Yes in Step S104), the control portion 11 makes the swing driving portion 24 raise the lifting plate 23 to stop the lifting plate 23 in the feeding position of the sheet S (Step S106). Then the control portion 11 ends the process according to FIG. 5.

The embodiment of the present disclosure described above is not meant to limit the scope of the disclosure, which can thus be implemented with various modifications made without departing from the spirit of the present disclosure.

For example, while the embodiment described above deals with the sheet feeding tray 22 arranged on the side face of the apparatus main body 2 of the image forming apparatus 1, the technology described herein is applicable not only to the sheet feeding tray 22. For example, the technology is applicable to any configuration where, in the sheet feeding cassette 21, the lifting plate is arranged in the feeding position of the sheet S when a feeding job for the sheet S starts and the lifting plate is arranged in the retracted position when the feeding job ends.

While, in the above embodiment, the image forming apparatus 1 is assumed to be an image forming apparatus for monochrome printing, this is not meant as any limitation to particular models. The image forming apparatus may be, for example, an image forming apparatus for color printing.

What is claimed is:

1. A sheet feeding device comprising:

a sheet storage portion in which a sheet is stacked;

a lifting plate that is arranged in the sheet storage portion, a downstream part of the lifting plate with respect to a sheet conveyance direction swingable in an up-down direction about an upstream part of the lifting plate with respect to the sheet conveyance direction to move the sheet stacked on a top face of the lifting plate between a feeding position and a retracted position lower than the feeding position;

a swing driving portion that swings in the up-down direction the downstream part of the lifting plate with respect to the sheet conveyance direction;

a feeding portion that separates and conveys the sheet arranged in the feeding position one by one downstream of the sheet storage portion in the sheet conveyance direction;

a sheet detection portion that is provided on the lifting plate, the sheet detection portion detecting whether a sheet is present on the lifting plate; and a control portion that controls operation of the swing driving portion and the feeding portion, wherein the control portion arranges the lifting plate in the feeding position when a feeding job for the sheet starts and arranges the lifting plate in the retracted position when the feeding job ends, and at an end of the feeding job, while the lifting plate is moving from the feeding position to the retracted position, if a detection state of the sheet detection portion changes from a sheet-present state to a no-sheet state, the control portion rearranges the lifting plate in the feeding position.

2. The sheet feeding device according to claim 1, wherein when the lifting plate is rearranged in the feeding position at the end of the feeding job, if the detection state of the sheet detection portion is the no-sheet state, the control portion arranges the lifting plate in the retracted position.

3. The sheet feeding device according to claim 1, wherein the sheet detection portion includes a reflection type optical sensor having a light-emitting portion and a light-receiving portion, the light-emitting portion irradiating the sheet on the lifting plate with detecting light, the light-receiving portion receiving the detecting light reflected by the sheet to detect whether the sheet is present on the lifting plate.

4. An image forming apparatus comprising:

the sheet feeding device according to claim 1.

5. The image forming apparatus according to claim 4, wherein the sheet storage portion is a sheet feeding tray that is arranged on a side face of an apparatus main body of the image forming apparatus and that can be opened and closed with an upper end part of the sheet feeding tray swinging in a lateral direction about a lower end part of the sheet feeding tray.

* * * * *